Sept. 19, 1961  E. F. WEBB  3,000,033
WINDSHIELD CLEARING SYSTEM
Filed May 7, 1958  2 Sheets-Sheet 1

INVENTOR.
EDMOND F. WEBB
BY Sowell & Henderson
ATTORNEY

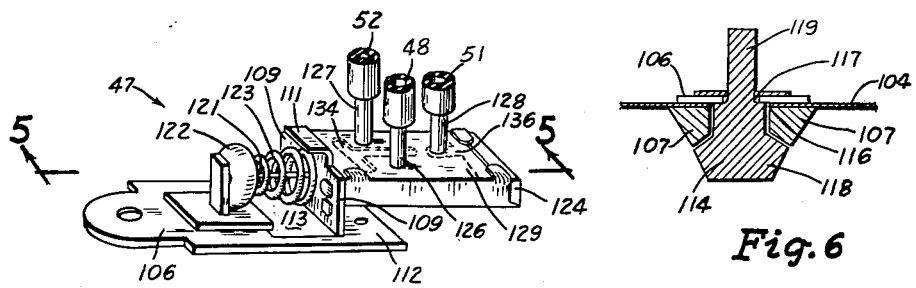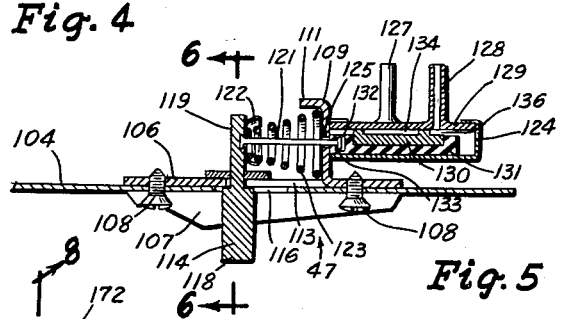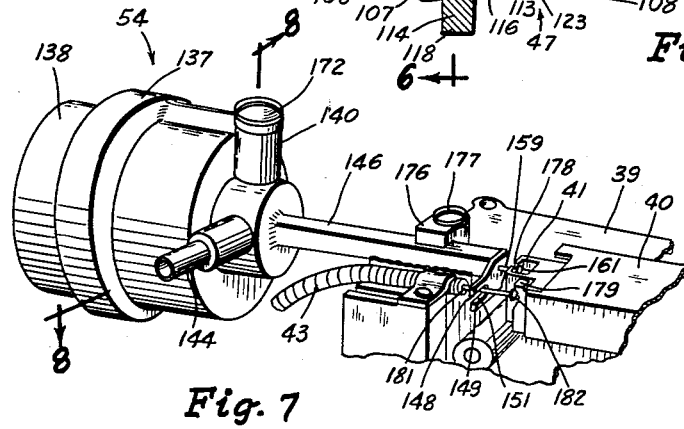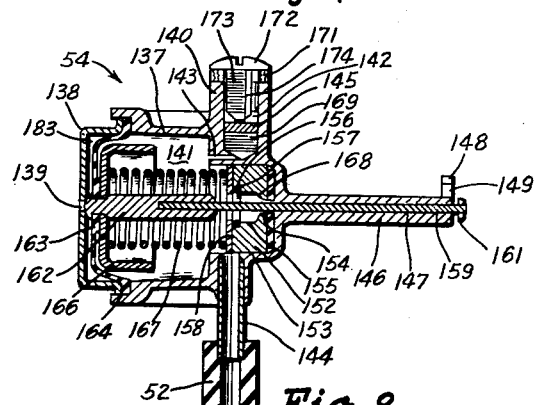

United States Patent Office
3,000,033
Patented Sept. 19, 1961

3,000,033
WINDSHIELD CLEARING SYSTEM
Edmond F. Webb, Franklin, Mich., assignor to The Delman Company, Cookeville, Tenn., a corporation of Tennessee
Filed May 7, 1958, Ser. No. 733,638
3 Claims. (Cl. 15—250.02)

This invention relates generally to windshield clearing systems and more particularly to a control device providing for the concurrent operation of the wiper and washer units and for operation of the wiper unit independently of the washer unit.

An object of this invention is to provide in a windshield clearing system an improved time delay device operable to concurrently actuate the wiper unit with operation of the washer unit and to de-actuate the wiper unit subsequently to de-actuation of the washer unit.

Another object of this invention is to provide in a windshield clearing system an attachment for a conventional suction operated windshield wiper motor, such attachment operable independently of a usual manual control for the wiper motor to concurrently actuate the wiper motor with operation of the washer unit and to de-actuate the wiper unit subsequently to the deactuation of the washer unit.

A further object of this invention is to provide in a windshield clearing system utilizing suction operated washer and wiper units, a time delay device operable concurrently with operation of the washer unit to actuate the wiper unit, and operable concurrently with de-actuation of the washer unit to initiate a delayed de-actuation of the wiper unit.

Yet a further object of this invention is to provide in a windshield clearing system utilizing a conventional suction operated windshield wiper motor, a fluid pump device for discharging fluid onto the windshield and at a time delay device for controlling the operation of the wiper motor relative to operation of the pump device, both pump and time delay devices being suction actuated.

Still another object of this invention is to provide in a windshield clearing system having a wiper unit and a washer unit, a device interposed in the suction pressure lines of the system which is operatively connected to the wiper unit and operable with the actuation and de-actuation of the washer unit to concurrently actuate the wiper unit, and to de-actuate the wiper unit at a time interval subsequent to the de-actuation of the washer unit.

An object of this invention is to provide an arrangement for attaining the above mentioned objectives which is economical to manufacture, easy to install, and effective in service and operation.

These objects and other advantages will become readily apparent by reference to the following description when taken in conjunction with the accompanying drawings, wherein:

FIG. 4 is an enlarged detail view of the control valve device of the invention;

FIG. 5 is a sectional view taken along the line 5—5 of FIG. 4;

FIG. 6 is a sectional view taken along the line 6—6 of FIG. 5;

FIG. 7 is an enlarged fragmentary perspective view of the time delay device in assembled relation with the windshield wiper motor, with some parts broken away for the purpose of clarity; and FIG. 8 is a sectional view taken along the line 8—8 of FIG. 7.

Figure 1:
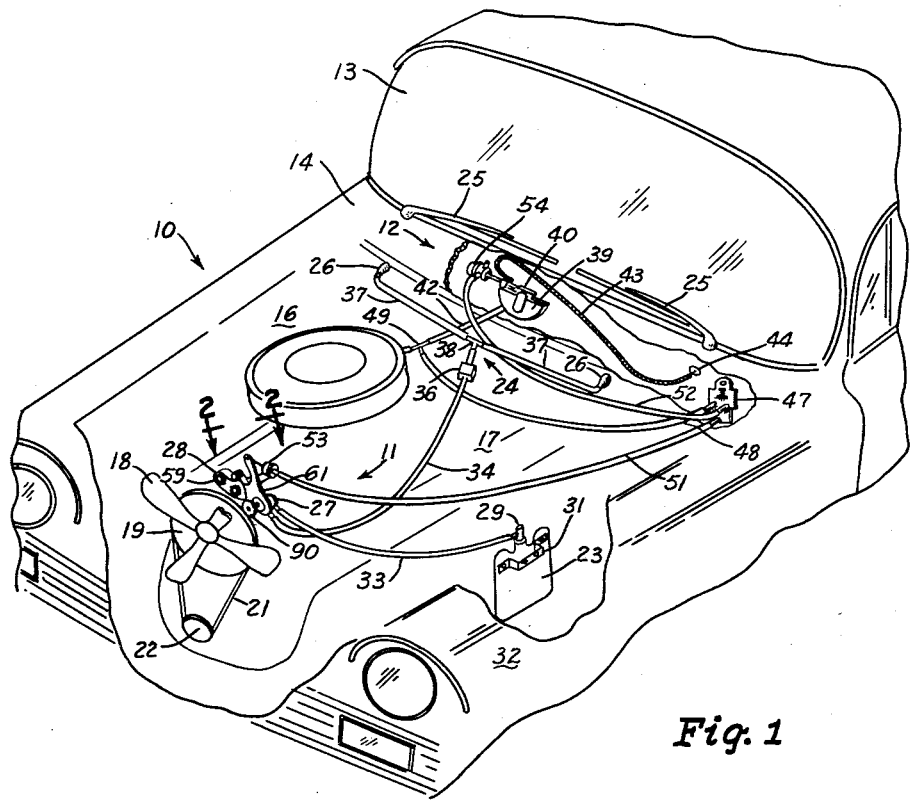
FIG. 1 is a fragmentary perspective view of a vehicle showing the invention in assembled relation therewith, with some parts broken away for purposes of clarity.

With reference to the drawings, there is illustrated in FIG. 1 a windshield clearing system as applied to an automobile 10 which includes a windshield washer unit and a windshield wiper unit designated generally as 11 and 12, respectively. The vehicle is illustrated as having a windshield 13 and an engine cowl 14 extended forwardly of the windshield. The automobile has the usual engine compartment 16 in which is mounted the engine 17, a water cooling fan 19, a pulley 19, and a fan belt 21 driven off a crank shaft pulley 22.

The windshield washer unit 11 includes a fluid reservoir 23 from which fluid is supplied to a discharge unit 24 which includes a pair of nozzle devices 26 for directing the fluid against the windshield 13 and into the path of a pair of wipers 25. Fluid pressure is applied by a pump unit 27, interconnected between the reservoir 23 and the discharge unit 24, and pivotally mounted on a mounting unit 28 which is carried on the front of the engine 17 adjacent the pulley 19.

The fluid reservoir 23 is shown as being a flexible bag having a filler opening at the top in which a plug 29 is insertable. The reservoir 23 is hung from a bracket 31 which is secured on the inside of a fender 32 of the vehicle 10, so as to be within the engine compartment 16. A fluid transmitting conduit 33 is connected between the reservoir 23 and the pump unit 27 to enable the latter unit, upon operation, to withdraw fluid from the reservoir 23, and then force the fluid under pressure through a conduit 34 to the nozzles 26.

The nozzle devices 26 of the fluid discharge unit 24 are shown as being mounted to the automobile directly in front of the cowl 14 in a spaced manner so that each device 26 services one side of the windshield 13. The nozzle devices 26 are of a known type embodying the jet principle, so as to emit and direct a high pressure stream of fluid against the windshield 13 and into the path of a respective wiper 25. A fluid conduit 37 connects each nozzle device 26 to a T fitting 38, the conduit 34 being attached to the stem of the fitting 38. A one way check valve 36 is interposed in the conduit 34 for the purpose of permitting fluid to flow through the conduit to the discharge unit 24, but preventing a backward or reverse flow therethrough toward the pump unit 27.

The wiper unit 12 includes the wipers 25 and a conventional suction-operated wiper motor 39 which has a valve 40 operated by a reciprocally movable actuating or control member 41 (FIG. 7) adapted for on-off control of the motor. A hose 42 (FIG. 1) connects the wiper motor 39 in the usual manner with the intake manifold (not shown) of the vehicle engine 17 which is utilized as a source of suction. A Bowden wire unit 43 includes a control knob 44 mounted on the vehicle dashboard (not shown) and is adapted to be operatively connected with the control member 41 in a manner hereinafter described for control of the motor independent of the washer unit 11.

For the purpose of controlling and coordinating the operation of the washer and wiper units 11 and 12, respectively, a control unit is provided. The control unit includes a valve device 47 (FIG. 1) mounted on the dashboard (not shown) and connected by a hose 48 to a T-fitting 49 interposed in the main suction hose 42. The control unit includes also a pair of hoses 51 and 52 which lead respectively from the valve device 47 to an actuating device 53 for the pump assembly 27, and to a time delay device 54 operatively connected with the control member 41 of the wiper motor 39. As will be described in detail hereinafter, the control unit is arranged to operate the washer and wiper units concurrently, and also to stop the operation of the wiper unit 12 at an interval of time subsequent to the stopping or de-actuation of the washer unit 11.

Figure 2:
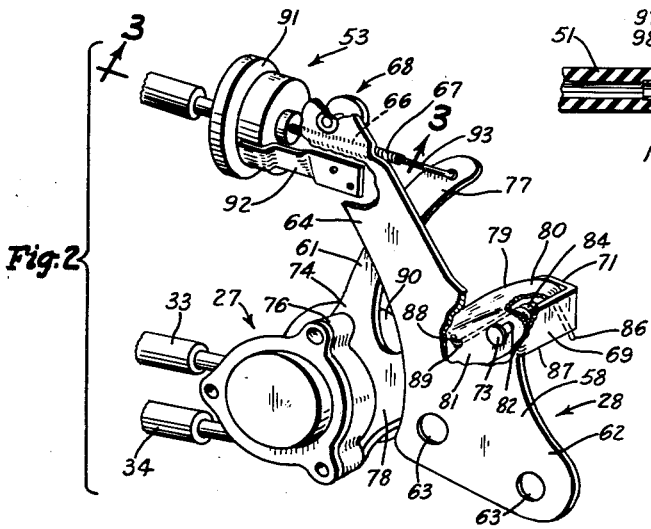
FIG. 2 is an enlarged, fragmentary exploded perspective view of the pump assembly of FIG. 1, with some parts broken away for purposes of clarity.

Referring now particularly to FIG. 2, the mounting unit 28 for pivotally mounting the pump unit 27 adjacent to the fan belt 21, includes a stationary bracket 58 which is secured to the front of the engine 17 by cap screws 59 (FIG. 1), and a pivoting bracket 61. The stationary bracket 58 has a base portion 62 formed with openings 63 through which the cap screws 59 are inserted, and an arm portion 64 extended from the base portion 62. A depression 66 is formed substantially transversely across the upper end of the arm 64 to receive an actuating wire unit 67, which is part of the actuating device 53. The unit 67 is secured in the depression 66 by a cap screw and washer arrangement 68 attached to the upper end of the arm 64. A flange 69 is extended laterally from the base portion 62 and has an element 71 bent at right angles so as to be parallel to the plane of the base portion 62, and a pair of aligned bores (not shown) are formed in the base portion 62 and the element 71 to receive a rivet or pivot pin 73.

The bracket 61 includes a base portion 74 adapted to be secured to one end 76 of the pump unit 27, an upper arm 77 to which the wire device 67 is attached, and a lower arm 78 to which the pivot pin 73 is connected. The lower arm 78 has a portion 79 flared outwardly and at right angles to the plane of the arm 78 and has a part 80 extended over the pivot pin 73. A shoulder member (not shown) depends from the outer edge of the flared portion 79 and extends parallel to and is spaced laterally from the outer end 81 of the lower arm 78. Aligned bores 82 (only one of which is shown) are formed, respectively, in the outer end 81 and in the depending shoulder member.

A coil spring 84 is inserted about the pivot pin 73 between the shoulder member and the outer end 81 of the arm 78, with one end 86 of the spring forcibly abutting the lower edge 87 (FIG. 2) of the flange 69, and the other end 88 of the spring 84 being bent so as to be inserted through an opening 89 formed in the lower arm 78.

By this arrangement, the spring 84 tends to bias the end 81 so as to move the lower arm 78 of the pivoting bracket 61, and thus the pump unit 27, clockwise with respect to the stationary mounting bracket 58, as viewed in FIG. 2, or counterclockwise as viewed in FIG. 1, whereby to normally maintain a circular driving wheel 90 of the pump unit 27 away from a contacting operative engagement with the fan belt 21.

The pump unit 27, attached to the pivoting bracket 61, is the subject of co-pending application entitled "Gear Pump," filed February 5, 1958, Serial No. 713,486. As it is not thought necessary to describe the unit 27 in detail herein, suffice it to state that the unit is a rotary gear type fluid pump which has the function, by virtue of receiving rotational drive from the fan belt 21 via the driving wheel 90, of withdrawing fluid from the reservoir 23 through the conduit 33, and in turn forcing the fluid under pressure through the conduit 34 to the nozzles 26.

Figure 3:
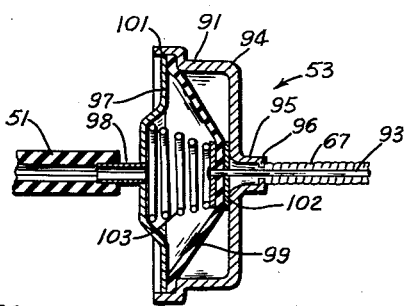
FIG. 3 is an enlarged detail sectional view of the suction actuating device for the pump assembly, taken along the line 3—3 of FIG. 2.

The actuating device 53 (FIGS. 2 and 3), controlled by the control valve device 47 in a manner hereinafter described, is suction operated and comprises a circular housing 91 secured to the arm portion 64 of the stationary bracket 58 by a securing device 92. By this arrangement, the aforementioned actuating unit 67 which protrudes from one end of the device 53, is aligned with the groove 66 formed in the arm portion 64 so that the actuating wire 93 of the unit 67 may be readily attached to the upper arm 77 of the pivoting bracket 61.

The housing 91 includes a main section 94 open at one end and closed at the other end, which closed end has a bearing portion 95 formed with a center bore 96. The diameter of the bore 96 is sufficiently larger than the diameter of the actuating wire 93 whereby air under atmospheric pressure may pass between the wire and the wall surface of the bore 96.

A circular cover section 97 for the main housing section 94 is secured about its periphery to the open end of the main section 94 so as to form therewith a vacuum chamber. The cover section 97 is provided with a hose connection 98 which is adapted to be connected to the hose 51 leading from the control valve device 47 (FIG. 1). Within the housing 91, a flexible diaphragm 99 is secured in a fluid tight manner about its periphery to the junction 101 between the main and cover sections 94 and 97, respectively. A retainer unit 102 is located centrally of the diaphragm and is connected to the inner end of the actuating wire 93. Thus, a reciprocal movement of the diaphragm 99 causes a like movement of the actuating wire 93. A coil spring 103 is arranged between one side of the retainer unit 102 and the inner side of the cover section 97 so as to bias the diaphragm 99 in a position best indicated in FIG. 3. It may be noted that the normal and inoperative position of the actuating wire 93 is one of being fully extended from the actuating device 53.

The control valve device 47 (FIG. 1), as mentioned hereinbefore, is fluid connected by the hose 48 to the main suction line 42, and is operable by manual actuation to permit the application of such suction to the actuating device 53 and the time delay device 54, via the hoses 51 and 52, respectively. The device 47, best shown in FIGS. 4-6, is of a slide valve type and is adapted to be mounted on a dashboard 104 (FIG. 5) by a bracket member 106 and a face plate 107 which are secured against respective sides of the dashboard 104 by screws 108.

The bracket member 106 is flat and paddle shaped and has a center portion 109 turned upwardly at a right angle and terminating in a lip member 111 bent parallel to the plane of the bracket 106. A slide lever 114 (FIG. 6) is inserted through slotted openings 116 and 117 provided in the dashboard 104 and bracket 106, respectively, whereby the lever 112 is reciprocally movable a predetermined distance within the slots 116 and 117. The outer portion 118 of the slide lever is adapted for finger contact, and the inner portion 119 is stem shaped and has attached thereto one end of an action wire 121 and a cup shaped spring retainer 122.

A coil spring 123 is arranged between the retainer 122 and the upright portion 109 of the bracket 106, whereby the slide lever 114 is biased in a normal and inoperative position at the end of the slots 116 and 117 remote from the upright portion 109, as best indicated in FIG. 5.

A box-like valve case 124 is secured at one end to the upright portion 109 so that the interior of the case is aligned with an opening 125 (FIG. 5) formed in the portion 109. The action wire 121 is slidable through the opening 125. A trio of hose connections 126, 127, and 128 are formed integral with the top 129 of the case 124, and are arranged in a T-formation. The laterally spaced connections 126 and 127 are connected to the hoses 48 and 52 respectively, and the hose connection 128 at the base of the T is connected to the hose 51.

Mounted within the case 124 is a slide valve 130 which is secured to a reciprocally movable retainer 131. The arrangement is such that the upper surface of the slide valve 130 contacts the lower surface of the top 129 of the case. A slot 132 is formed in the end of the retainer 131 adjacent the upright portion 109 and is adapted to receive therein a head 133 formed on the end of the wire 121. Thus, reciprocal movement of the action wire 121 causes a like movement of the retainer 131.

Formed in the top of the slide valve 130 are a pair of separated depressions 134 and 136. The depression 134 is T-shaped (FIG. 4) and of an extent to lie below all three of the hose connections 126–128. The depression 136 is formed at the end of the valve 130 opposite the slotted end and is open to the interior of the case 124.

Referring particularly to FIG. 5, it is noted that by virtue of the normal position of the slide lever 114, the normal position of the slide valve 130 is such that the depression 136 is aligned with the hose connection 128 and the upper surface of the valve 130 in effect forms a closure at the bases of the connections 126 and 127. Thus, in the normal inoperative position of the slide valve 130, the hoses 48 and 52 are not open to but are shut off from the hose 51. Consequently, as the suction through the hose 48 is effectively shut off or blocked at the connections 126, it is not applied to the actuating device 53 and the time delay device 54 and these devices are each in an inoperative or rest position.

However, upon movement of the slide lever 114 against the compression of the coil spring 123, the retainer 131 and thus the slide valve 130 are moved within the case 124 to a position wherein the T-shaped depression 134 is located directly under all three hose connections 126–128. Therefore, in the actuated position of the slide lever 114, the hose 48 is open to the hoses 51 and 52, whereby suction from the intake manifold is applied to the actuating device 53 and the time delay device 54. Conversely, upon a release of the slide lever 114, the coil spring 123 acts to bias the lever and the slide valve 130 back to their normal positions, wherein the suction is immediately shut off from the devices 53 and 54.

The time delay device 54, best shown in FIGS. 7 and 8, comprises a substantially cylindrical casing 137 having one end closed, the other end open, and which open end is covered by a plate 138. An opening 139 is formed centrally of the cover plate 138 for a purpose hereinafter described. By this arrangement, a fluid tight chamber 141 is formed within the casing 137.

The casing 137 includes further a bleed plug housing 140 in which is formed an internally threaded opening 142 communicable with the chamber 141 by a passage 143. A hose connection 144 is inserted through a wall of the body 137 and also is in fluid communication with the chamber 141. Additionally, an extension member 146 is formed integral with the body 137 and has a bore 147 formed therein which is aligned with the longitudinal axis of the casing 137. A yoke member 148 is formed at the outer end of the extension member 146 and includes a pair of bifurcations 149.

A circular retainer 152, mounted within a cavity 153 provided in the casing 137, has a small bore 154 formed at its outer end and a large bore 155 formed at its inner end adjacent the small bore 154. A recess 156 at the inner end of the bore 155 carries an O-ring seal 157 which is retained by a washer 158 secured within the cavity 153 and adjacent the inner end of the retainer 152. An actuating wire 159 is inserted through the bore 147 of the extension member 146 and through the small bore 154 of the retainer 152. A bead 161 is formed on the outer end of the actuating wire 159, and a connector member 162 is secured to the inner end of the wire 159. The connector member 162 is secured centrally of a flexible diaphragm 163 which in turn is secured about its peripheral edge to the junction 164 between the body 137 and the cover plate 138. A cup shaped piston 166 is also mounted centrally to the connector member 162 and is maintained in a normal position best shown in FIG. 8 by a coil spring 167 arranged between the piston 166 and the washer 158.

Of note, the normal position of the piston 166 is such that the normal position of the actuating wire 159 is that of being drawn within the casing 137, whereby the bead 161 of the wire is closely adjacent the yoke member 148. As will be explained hereinafter, in this normal position of the actuating wire 159, the wiper motor 39 is inoperative. Upon a movement of the piston 166 and the diaphragm 163 forwardly or to the right as seen in FIG. 8, against the compression of the spring 167, the connector member 162 is moved into the large bore 155 of the retainer 152 until it seats against the shoulder 168 formed between the bores 154 and 155 of the retainer. At this actuated position of the wire 159, wherein the bead 161 has been moved outwardly of the extension member 146, the wiper motor 39 is operative.

For the purpose of permitting air under atmospheric pressure to bleed into the chamber 141 at a rate less than that provided by the opening 139 in the cover plate 138, a plurality of flat, circular plug members 169 of a fibrous, porous material such as felt, are inserted one on top of another in the bottom area of the bleed plug opening 142. The members 169 are pre-compressed an amount necessary to obtain a sufficient air restriction while maintaining a sufficient area for dirt tolerance. For example, where three felt members one-half inch in diameter and one-fourth inch thick were used, they were compressed to less than one-tenth their original thickness to achieve the desired results. An X-shaped retainer plug 145 is placed on top of the members 169, and a fibrous washer 171 is placed on top of the opening 142. A slab-sided screw is then inserted in the opening whereby the head 172 of the screw clamps down on the washer 171 and the flat side of the steam 173 provides an air passage 174 along the opening 142. Thus, it is seen that the air bleed in the housing 140 is adjustable in two ways, by the amount of compression of the screw on the washer 171, which acts in effect as an air cleaner at the entry, and on the members 169 whereby to determine their restriction to the passage of air therethrough.

By slidably inserting the extension member 146 in a slot provided therefor by a guide unit 176 (FIG. 7) mounted on and secured to the top of the wiper motor by a bolt device 177, the entire time delay device 54 is secured to the motor 39 and is also adapted to move back and forth relative to the wiper motor. The slot in the guide unit 176 is aligned with the control member 41 whereby the bead 161 formed on the outer end of the actuating wire 159 is adapted to be connected to a slotted portion 178 of the member 41.

By virtue of the mounting arrangement of the extension member 146, the yoke member 148 is located in a position where the space 151 between the bifurcations 149 is aligned with an offset portion 179 of the control member 41. Thus, by securing, as by the guide unit 176, the Bowden wire unit 43, the wire 181 of the unit extends through the space 151. A bead 182 at the end of the wire 181 is therefore located between the yoke member 148 and the offset portion 179 of the control member 41 for a purpose hereinafter described.

In the operation of the windshield clearing system, let it be assumed that the position of all the elements included therein as viewed in the figures correspond to an inactive or rest condition of the system. In this condition, the control valve device 47 is in an inoperative position whereby the source of suction or vacuum of the intake manifold is shut or blocked off from the actuating device 53 for the pump and mounting units 27 and 28, respectively, and from the time delay device 54 for the windshield wiper motor 39.

To place the system into operation, the slide lever 114 of the control valve device 47 is moved against the compression of the spring 123 whereby to move the T-shaped depression 134 of the slide valve 130 below all three hose connections 126, 127, 128. Thus, the suction of the intake manifold is applicable through the control valve device 47 and the hoses 51 and 52 to the actuating device 53 and the time delay device 54.

In the actuating device 53, the suction forces the diaphragm 99 against the compression of the spring 103, whereby to pull the actuating wire 93 into the housing 91. This movement of the wire 93 forces the upper arm 77 of the pivoting bracket 61 in a counter-clockwise direction, as viewed in FIG. 2, against the bias of the spring 84 to thus move the driving wheel 90 of the pump unit 27 into contact with the fan belt 21. By this movement of the pivoting bracket 61, the pump unit 27 is operated whereby to withdraw fluid from the reservoir 23 and to force the fluid to the discharge unit 24 and out the nozzle devices 26 to both sides of the windshield 13.

Concurrently with the initiation of operation of the washer unit 11, operation of the wiper unit 12 is also initiated. The suction pressure in hose 52 is applied through the outlet tube 144 to the chamber 141 of the time delay device 54. Thus, the piston 166 and the diaphragm 163 are moved into an operative position wherein the connector member 162 is moved against the shoulder 168 of the retainer 152. This movement of the connector member causes a like movement of the actuating wire 159 whereby to move the control member 41 inwardly of the control valve 40, thus starting the wiper motor 39. Of note, the rate of movement of the actuating wires 93 and 159 to place their respective devices 53 and 54 into operation is substantially the same so as to result in a concurrent operation of the washer and wiper units.

Upon a release of the slide lever 114, the compression of the spring 123 returns the lever and the slide valve 130 to their normal positions, wherein the hose lines 48 and 52 are shut off from the atmosphere and the hose line 51 is open to the atmosphere.

In the actuating device 53, a combination of the compression of the coil spring 103 aided by the entry into the housing 91 of air under atmospheric pressure through the hose 51 forces the diaphragm 99 and the retainer unit 102 against the bearing portion side of the front section 94, air in front of the diaphragm being expelled through the space between the bearing portion bore 96 and the actuating wire 93. This forces the pivoting bracket 61 to move, as aided by the torsion spring 84, in a clockwise direction or rotation so as to move the pump unit wheel 90 away from its engaging position with the fan belt 21. Thus, the operation of the pump unit 27 is immediately stopped to halt the discharge of the cleansing fluid through the discharge unit 24.

In the time delay device 54, the return of the diaphragm 163 and the piston 166, and thus the actuating wire 159, to their inoperative position whereby to stop the operation of the wiper motor 39, is delayed by virtue of the bleed plug arrangement, as compared to the rate of return movement of the actuating device diaphragm 99 to stop operation of the pump unit 27. The coil spring 167 is of a strength that it will not overcome the air trapped under atmospheric pressure within an expansible chamber 183 formed between the diaphragm 163 and the cover plate 138, without the aid of air under atmospheric pressure within the chamber 141. As the air outside the time delay device 54, in order to enter the chamber 141, needs to pass through the felt washer 171, the air passage 174, and the plurality of felt plugs 169 before it may enter the chamber 141 through the passage 143, it is seen that the reduction of the rate of air passage into the chamber 141 is thus effective to permit only a gradual return movement of the piston 166 and the actuating wire 159 to their normal inoperative position.

Thus, although upon a release of the control valve device 47 the actuating device 53 immediately stops operation of the washer unit 11, by virtue of the initiation of a delaying action within the time delay device 54, the operation of the wiper unit 12 is not stopped until an interval of time subsequent to the stopping of the washer unit operation.

Of note, the movement of the actuating wire 159 by virtue of the movement of the retainer 166 is relative to the yoke 148 and in no way effects the hand operated Bowden wire unit 43 (FIG. 7). Hand actuated movement, however, of the Bowden wire unit 43 to turn on the wiper motor 39 is operable to cause the entire time delay device 54 to move toward the wiper units 39. This occurs due to the bead 182 of the hand wire 181 contacting the offset portion 179 and forcing the control member 41 inwardly of the valve 40, which in turn, by virtue of the connection of the delay actuating wire 159 with the control member 41, tends to move the wire 159 also toward the motor 39. As such movement of the wire 159 is resisted by the force of the spring 167 against the piston 166, which force is greater than that frictional force restraining the device 54 from sliding, the device 54 moves forward toward the wiper motor concurrently with movement of the hand operated wire 181.

On return movement or movement away from the wiper motor 39 of the wire 181, the bead 182, after moving a predetermined distance, contacts the yoke member 148 and thus forces the entire time delay device 54 to move away from the motor 39 to its original position. Here again, due to the resistance to compression of the delay device spring 167 being greater than the resistance to movement of the device 54, the entire device 54 moves away from the motor.

Although a single preferred embodiment of the invention has been disclosed herein, it is to be remembered that various modifications and alternate constructions may be made within the full intended scope of the invention as defined in the appended claims.

I claim:

1. In a vehicle windshield clearing system which includes a wiper unit having a suction operated wiper motor including a control means and a source of suction communicable with said motor by said control means, and a washer unit including a fluid pump assembly operable to discharge fluid against the windshield, an arrangement for concurrently initiating operation of said wiper and washer units while delaying de-actuation of said wiper unit relative to said washer unit comprising, suction operated actuating means including a housing having an opening formed therein whereby air under atmospheric pressure may pass into said housing at a certain rate, flexible diaphragm means mounted in said housing and forming thereby a first suction chamber open to the atmosphere through said opening, means mounted in said housing and biasing said diaphragm means into an inoperative position, said diaphragm means operatively connected with said pump assembly, suction operated time delay means including a housing, flexible diaphragm means mounted in said housing and forming thereby a second suction chamber, air bleed means formed in said housing and communicating the atmosphere with said second suction chamber whereby atmospheric air may pass into said second suction chamber at a rate slower than said certain rate, said diaphragm means operatively connected to said control means, and manually operated valve means communicable with said suction source and adapted to simultaneously apply said suction to said respective suction chambers and simultaneously to stop said application.

2. In a vehicle windshield clearing system which includes a suction operated wiper motor having a movable control valve for on-off control thereof, a source of suction operatively connected to said wiper motor, a manually actuated device connected to said control valve, and suction controlled apparatus for discharging fluid onto the windshield; time delay means comprising a housing having a chamber formed therein, suction responsive means mounted in said chamber and having an actuating member operatively connected to said control valve, said suction responsive means including also a flexible diaphragm member mounted within said chamber and dividing said chamber into two compartments, and including further spring means biasing said diaphragm member into a normal inoperative position wherein said motor is inoperative, said actuating member connected to said diaphragm member, air transmission means including an unrestricted opening formed in said housing and opening said first compartment to the atmosphere, and including further an internally threaded opening formed in said housing and opening said second compartment to the atmosphere, a series of wafer-like fibrous elements inserted within said threaded opening, a screw member having a stem with a longitudinally extended portion cut away inserted within said threaded passage above said series of elements, a retainer member having a solid center inserted between said wafer elements and said screw member, and a second fibrous element separating the head of said bolt from the mouth of said threaded opening, and manually actuated valve means independently fluid interconnecting said suction source to said discharge apparatus and to said second compartment and operable to apply said suction to said diaphragm member whereby said diaphragm member is forced into an operative position to move said control valve to operate said wiper motor concurrently with said discharge apparatus.

3. In a vehicle windshield clearing system having a wiper motor and a control valve therefor, and a washer unit including a pump means and a nozzle, a fluid pressure operated actuating unit for said control valve, a source of fluid pressure having a supply line, a fluid pressure system including an expansible chamber means in said actuating unit, having a movable wall operatively associated with said control valve, and means for fluid connecting said supply line with said chamber means, a valve unit in said fluid connecting means for controlling the admission of fluid pressure to said chamber means, a pressure bleed means for said chamber means located in said fluid pressure system and including a fluid passage means open at one end to said system and to the atmosphere at the other end thereof, said passage means having an internally threaded portion, an adjustable screw member having a head section and a shank section with a threaded portion, said shank section being formed with a longitudinally extended cutaway portion and insertable through the other end of said passage means for engagement of the threaded portion thereof with the internally threaded portion of said passage means, and a porous compressible material for restricting the flow of fluid through said passage means and compressible by said screw member to provide for a variation in the rate of flow of fluid through said passage means in response to adjustment of said screw member.

References Cited in the file of this patent

UNITED STATES PATENTS

| | | |
|---|---|---|
| 2,327,195 | Kosky | Aug. 17, 1943 |
| 2,743,473 | Oishei | May 1, 1956 |
| 2,769,194 | Oishei | Nov. 6, 1956 |
| 2,860,362 | Riester | Nov. 18, 1958 |